(12) United States Patent
Mack-Crane et al.

(10) Patent No.: US 8,665,746 B2
(45) Date of Patent: Mar. 4, 2014

(54) METHOD FOR MEASURING THROUGHPUT FOR A PACKET CONNECTION

(75) Inventors: T. Benjamin Mack-Crane, Downers Grove, IL (US); Linda Dunbar, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 428 days.

(21) Appl. No.: 13/074,102

(22) Filed: Mar. 29, 2011

(65) Prior Publication Data

US 2011/0243029 A1 Oct. 6, 2011

Related U.S. Application Data

(60) Provisional application No. 61/319,237, filed on Mar. 30, 2010.

(51) Int. Cl.
*H04L 12/26* (2006.01)
(52) U.S. Cl.
USPC .......................................... 370/253
(58) Field of Classification Search
None
See application file for complete search history.

(56) References Cited

U.S. PATENT DOCUMENTS

| | | | | |
|---|---|---|---|---|
| 6,058,102 | A * | 5/2000 | Drysdale et al. | 370/252 |
| 6,751,226 | B1 * | 6/2004 | Schow | 370/409 |
| 6,975,617 | B2 * | 12/2005 | Walker et al. | 370/349 |
| 2002/0176367 | A1 * | 11/2002 | Gross | 370/252 |
| 2003/0198184 | A1 * | 10/2003 | Huang et al. | 370/231 |
| 2004/0151117 | A1 * | 8/2004 | Charcranoon | 370/235 |
| 2006/0120300 | A1 * | 6/2006 | Gross | 370/252 |
| 2007/0291654 | A1 * | 12/2007 | Pepper | 370/252 |

OTHER PUBLICATIONS

Frost, D., et al; "Packet Loss and Delay Measurement for MPLS Networks, draft-ietf-mpls-loss-delay-01," MPLS Internet Draft; Feb. 4, 2011, 44 pages.
ITU-T Recommendation Y.1731, OAM Functions and Mechanisms for Ethernet Based Networks, Feb. 2008, 82 pages.
ITU-T Recommendation Y.1731 (2008) Amendment 1, OAM Functions and Mechanisms for Ethernet Based Networks, Amendment 1: Addition of New OAM "ETH-CSF", Interoperability Between ETH-LT (2006) and ETH-LT (2008), Jul. 2010, 20 pages.
"IEEE Standard for A Precision Clock Synchronization Protocol for Networked Measurement and Control Systems," IEEE Instrumentation and Measurment Society, IEEE Std 1588-2008, Jul. 24, 2008, 289 pages.
Frost, D., Ed., "Packet Loss and Delay Measurement for MPLS Networks," draft-ietf-mpls-loss-delay-00, Dec. 23, 2010, 40 pages.

(Continued)

*Primary Examiner* — Anh-Vu Ly
(74) *Attorney, Agent, or Firm* — Conley Rose, P.C.; Grant Rodolph; Rayhao Chung

(57) ABSTRACT

An apparatus comprising a first node configured to couple to a second node, wherein the first node is further configured to exchange a plurality of timestamps recording transmission times and at least one of a plurality of octet counts and a plurality of frame counts with the second node to perform throughput measurements, and wherein the at least one of the plurality of octet counts and the plurality of frame counts correspond to a packet flow between the first node and the second node and are used to calculate throughput for the packet flow based on a time interval of the exchanged at least one of the plurality of octet counts and the plurality of frame counts that is determined using the timestamps.

25 Claims, 6 Drawing Sheets

(56) References Cited

OTHER PUBLICATIONS

Frost, D., Ed., et al., "A Packet Loss and Delay Measurement Profile for MPLS-based Transport Networks," draftietf-mpls-tp-loss-delay-profile-00, Dec. 23, 2010, 6 pages.

Frost, D., Ed., et al., "A Packet Loss and Delay Measurement Profile for Mpls-based Transport Networks," draftietf-mpls-tp-loss-delay-profile-01, Dec. 24, 2010, 6 pages.

Frost, D., Ed., et al., "A Packet Loss and Delay Measurement Profile for Mpls-based Transport Networks," draftietf-mpls-tp-loss-delay-profile-02, Feb. 4, 2011, 6 pages.

Aggarwal, R., et al., "Bidirectional Forwarding Detection (BFD) for MPLS Label Switched Paths (LSPs)," RFC 5884, Jun. 2010, 13 pages.

Almes, G., et al., "A One-Way Packet Loss Metric for IPPM," RFC 2680, Sep. 1999, 16 pages.

Almes, G., et al., "A One-Way Delay Metric for IPPM," RFC 2679, Sep. 1999, 21 pages.

Almes, G., et al., "A Round-Trip Delay Metric for IPPM" RFC 2681, Sep. 1999, 21 pages.

Andersson, L., Ed., et al., "LDP Specification," RFC 5036, Oct. 2007, 136 pages.

Andersson, L., et al., "Multiprotocol Label Switching (MPLS) Label Stack Entry: "EXP" Field Renamed to "Traffic Class" Field," RFC 5462, Feb. 2009, 10 pages.

Awduche, D., et al., "RSVP-TE: Extensions to RSVP for LSP Tunnels," RFC 3209, Dec. 2001, 62 pages.

Bocci, M., et al., "MPLS Generic Associated Channel," RFC 5586, Jun. 2009, 20 pages.

Bocci, M., et al., "A Framework for MPLS in Transport Networks," RFC 5921, Jul. 2010, 57 pages.

Bradner, S., "Key Words for Use in RFCs to Indicate Requirement Levels," RFC 2119, Mar. 1997, 4 pages.

Bryant, S., Ed., et al., "Pseudo Wire Emulation Edge-to-Edge (PWE3) Architecture," RFC 3985, Mar. 2005, 43 pages.

Demichelis, C., et al., "IP Packet Delay Variation Metric for IP Performance Metrics (IPPM)," RFC 3393, Nov. 2002, 22 pages.

Fang, L., Ed., et al., "Security Framework for MPLS and GMPLS Networks," RFC 5920, Jul. 2010, 67 pages.

Frost, D., et al., "MPLS Transport Profile Data Plane Architecture," RFC 5960, Aug. 2010, 16 pages.

Grossman, D., et al., "New Terminology and Clarification for Diffserv," RFC 3260, Apr. 2002, 11 pages.

Hedayat, K., et al., "A Two-Way Active Measurement Protocol (TWAMP)," Rfc 5357, Oct. 2008, 27 pages.

Kent, S., et al., "Security Architecture for the Internet Protocol," RFC 4301, Dec. 2005, 102 pages.

Le Faucheur, F., Ed., et al., "Multi-Protocol Label Switching (MPLS) Support of Differentiated Services," RFC 3270, May 2002, 65 pages.

Nichols, K., et al., "Definition of the Differentiated Service Field (DS Field) in the IPv4 and IPv6 Headers," RFC 2474, Dec. 1998, 21 pages.

Mills, D., et al., "Network Time Protocol Version 4: Protocol and Algorithms Specification," RFC 5905, Jun. 2010, 111 pages.

Morton, A., et al., "Packet Delay Variation Applicability Statement," RFC 5481, Mar. 2009, 39 pages.

Rosen, E., et al., "Multiprotocol Label Switching Architecture," RFC 3031, Jan. 2001, 62 pages.

Shalunov, S., et al., "A One-Way Active Measurement Protocol (OWAMP)," RFC 4656, Sep. 2006, 57 pages.

Swallow, F., et al., "Avoiding Equal Cost Multipath Treatment in MPLS Networks," RFC 4928, Jun. 2007, 9 pages.

\* cited by examiner

METHOD FOR MEASURING THROUGHPUT FOR A PACKET CONNECTION

CROSS-REFERENCE TO RELATED APPLICATIONS

The present application claims the benefit of U.S. Provisional Patent Application No. 61/319,237 filed Mar. 30, 2010 by T. Benjamin Mack-Crane and entitled "Method for Measuring Throughput for a Packet Connection," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Modern communications and data networks are comprised of nodes that transport data through the network. The nodes may include routers, switches, bridges, or combinations thereof that transport the individual data packets or frames through the network. Some networks may offer data services that forward data frames or packets from one node to another node across the network without using pre-configured routes on intermediate nodes. Other networks may forward the data frames or packets from one node to another node across the network along pre-configured or pre-established paths. Some networks also implement packet loss measurements to determine the quality of connections. Packet loss measurements may be used to count the lost packets in the connections between different nodes. Additionally, throughput measurements may be useful to assess the quality of connections in a network or to gather traffic data. Throughput measurements may be used to determine the average rate of successful message delivery over a communication channel. This data may be delivered over a physical or logical link, or passed through a certain network node. The throughput is usually measured in bits per second (bit/s or bps), and sometimes in data packets per second or data packets per time slot.

SUMMARY

In one embodiment, the disclosure includes an apparatus comprising a first node configured to couple to a second node, wherein the first node is further configured to exchange a plurality of timestamps recording transmission times and at least one of a plurality of octet counts and a plurality of frame counts with the second node to perform throughput measurements, and wherein the at least one of the plurality of octet counts and the plurality of frame counts correspond to a packet flow between the first node and the second node and are used to calculate throughput for the packet flow based on a time interval of the exchanged at least one of the plurality of octet counts and the plurality of frame counts that is determined using the time stamps.

In another embodiment, the disclosure includes a network component comprising a receiver configured to receive a measurement message that comprises a time interval counter, a first octet count, and an indication of a query for throughput measurements; a logic circuit configured to generate a second octet count if the query is accepted; and a transmitter configured to send in a measurement reply the time interval counter, the first octet count, the second octet count, and an indication that the query is accepted or rejected.

In a third aspect, the disclosure includes a method comprising receiving at least one of a plurality of frame counts and a plurality of octet counts that correspond to a first throughput measurement exchange and a subsequent second throughput measurement exchange; determining a time interval between the first throughput measurement exchange and the second throughput measurement exchange based on a first timestamp for the first throughput measurement exchange and a second timestamp for the second throughput measurement exchange; and calculating a plurality of throughput values based on at least one of the frame counts and the octet counts and based on the time interval.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a system and method for measuring a throughput of transmitted packets over a network connection. The throughput measurements method may use a plurality of measurement message (MM) and measurement reply (MR) frames that carry frame counts and/or octet counts. Additionally, the MM and MR frames may comprise timestamps that may be used to calculate time intervals for a plurality of exchanged frames. The time intervals may be used with the frame counts to calculate a frame throughput and/or with the octet counts to calculate octet throughput. The throughput measurements method may be achieved with reduced impact from loss of packets or data that are used in the measurements.

Figure 1:
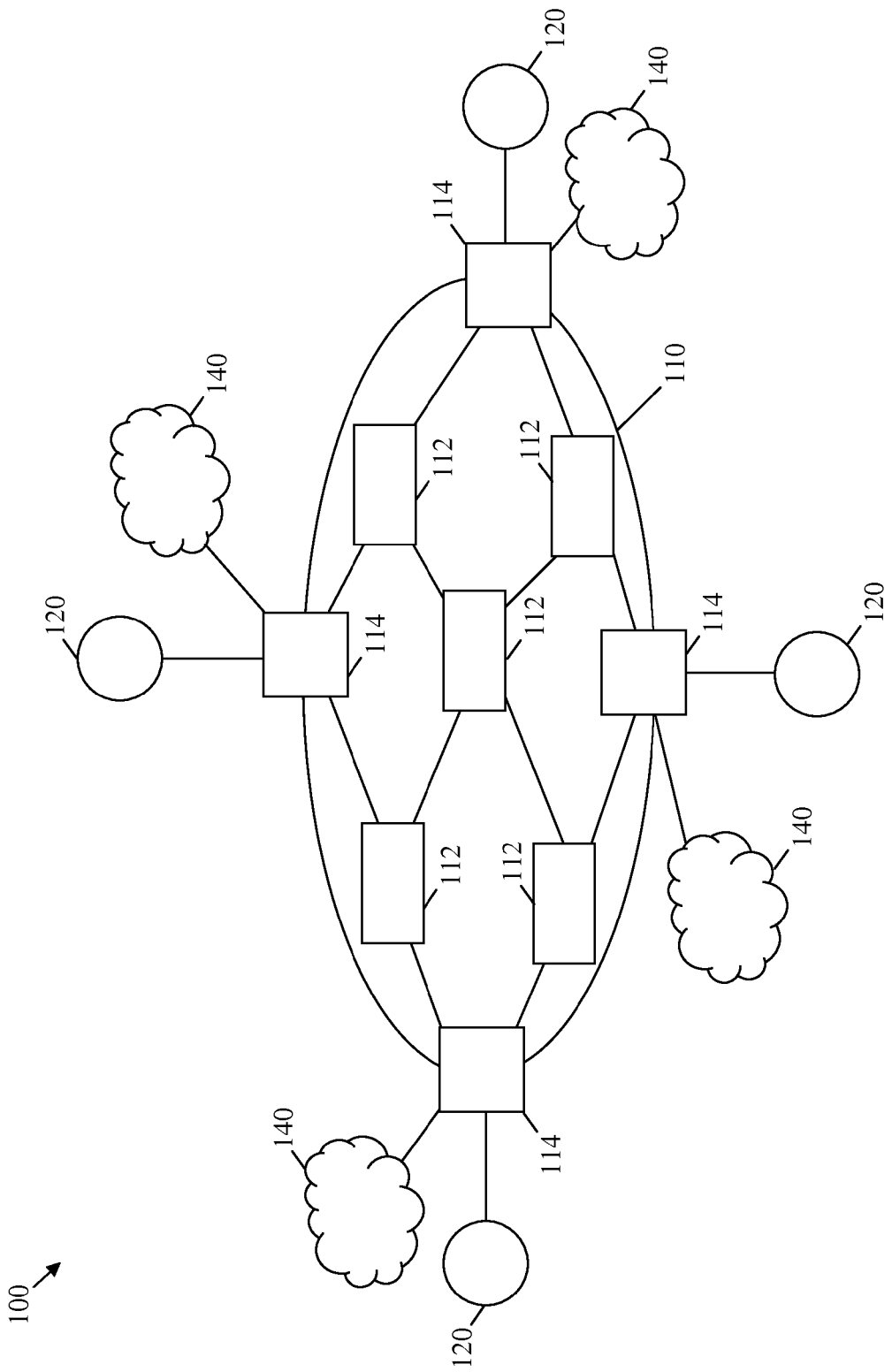
FIG. 1 is a schematic diagram of one embodiment of a packet based network.

FIG. 1 illustrates an embodiment of a packet based network 100 that may be used to transport and deliver packets. The packets may be transported between any two nodes in or coupled to the network. For instance, the packet based network 100 may be an Ethernet network, an Internet Protocol (IP) network, a Multi-Protocol Label Switching (MPLS) network, or any other packet switched network (PSN). The packet based network 100 may comprise a plurality of core nodes 112 and a plurality of edge nodes 114 that may be located in one or more domains 110. The packet based network 100 may also be coupled to a plurality of external nodes 120 and/or external networks 140.

The core nodes 112 and similarly the edge nodes 114 may be any nodes, devices, or components configured to receive, transmit, and/or forward packets in the packet based network 100 or the one or more domains 110. The edge nodes 114 may also exchange packets with the external nodes 120 and/or the external networks 140. In an embodiment, the packet based network 100 may be a provider bridged network (PBN), the core nodes 112 may be provider core bridges (PCBs), and the edge nodes 114 may be Provider Edge Bridges (PEBs). Alternatively, the packet based network 100 may be a provider backbone bridged network (PBBN) or an access network.

The external nodes 120 may be any nodes, devices, or components configured to send and/or receive packets to/from the packet based network 100, e.g., via the edge nodes 114. The external nodes may be located at separate networks or domains from the packet based network 100 or the one or more domains 110 or may be located at customer premises or distribution sites. Similarly, the external networks 140 may be any networks, e.g., any PSNs, that send and/or receive packets to/from the packet based network 100. The external nodes 120 and/or external networks 140 may comprise any provider equipment configured to send services or content to the packet based network 100. Additionally or alternatively, the external nodes 120/external networks 140 may comprise customer providers, customer edges, and/or customer devices that receive services or content from the packet based network 100.

The external networks 140 may comprise content routers that transmit content, such as on demand content or real time programming to subscribers via the packet based network 100. Alternatively, the external networks 140 may be any networks that provide subscribers access to services or content in the packet based network 100, such as Virtual Private Networks (VPNs). The external nodes 120 may be fixed or mobile user-oriented devices, such as desktop computers, notebook computers, personal digital assistants (PDAs), or cellular telephones. Alternatively, the customer nodes 120 may be connectivity devices at customer premises, such as modems or set-top boxes. The customer nodes 120/external networks 140 may also comprise customer equipment (not shown) that may be configured to receive services or content from the edge nodes 114 and distribute the services or content to a plurality of customers. For instance, the customer nodes 120/external networks 140 may comprise optical network units (ONUs) and/or very high bit rate digital subscriber line (DSL) or VDSL transceiver units at residential locations (VTU-Rs).

Additionally, the core nodes 112 and edge nodes 114 may be configured to measure bidirectional delivered throughput for the packet connections using a plurality of MM and MR frames, which may be exchanged between the core nodes 112 and edge nodes 114. To enable throughput measurements, the MM and MR frames may comprise: 1) a counter to measure bits or octets (e.g., octet count), a counter to measure frames (e.g., frame count), or both, and 2) a counter to measure the time interval between measurements, such as a timestamp or a sequence number. Since packets typically comprise an integer number of octets, using an octet count may be sufficient and smaller than using an equivalent bit count. The octet count and/or the frame count may be included in the measurement (MM and MR) frames. A plurality of frame counts and/or octet counts in a plurality of exchanged MM and MR frames may be used to measure the throughput of packets associated with exchanged frames, as described in detail below. Determining the throughput of packets may be useful to assess the quality of connections in a network or to gather traffic data, for example, to determine bit transmission and/or frame processing.

In an embodiment, the throughput of both offered packets and delivered packets may be measured in a manner compatible with an existing packet loss measurement method. The throughput for bidirectional transmitted packets, over the connection, may be measured based on a packet loss measurement method described in the Telecommunication Standardization Sector (ITU-T) Recommendation Y.1731, which is incorporated herein by reference. The throughput measurements method may use a plurality of loss measurement message (LMM) and loss measurement reply (LMR) Operations, Administration, and Management (OAM) frames that carry frame counts for calculating packet loss.

For instance, the nodes above may be coupled to each other via a plurality of fixed connections or links. The core nodes 112 and edge nodes 114 may be configured to measure packet loss in the links using ITU-T Recommendation Y.1731. The core nodes 112 and edge nodes 114 may exchange LMM and LMR frames including frame counts, and may use the frame counts in the frames to calculate packet losses in the links or connections. The packet loss in a connection may be calculated using the following counts or values:

TxFCf: Transmitted frame count in the forward direction;
RxFCf: Received frame count in the forward direction;
TxFCb: Transmitted frame count in the backward (returned) direction; and
RxFCl: Local received frame count (or RxFCb: received frame count in the backward direction).

Additionally, the LMM and LMR frames may comprise counters to measure time intervals (e.g., timestamps), which may be used with the frame counts to measure the frame throughputs of packets associated with the links. Further, the LMM and LMR frames may also comprise octet counts that may be used with the time interval counters to measure the octet throughput on the links.

Figure 2:
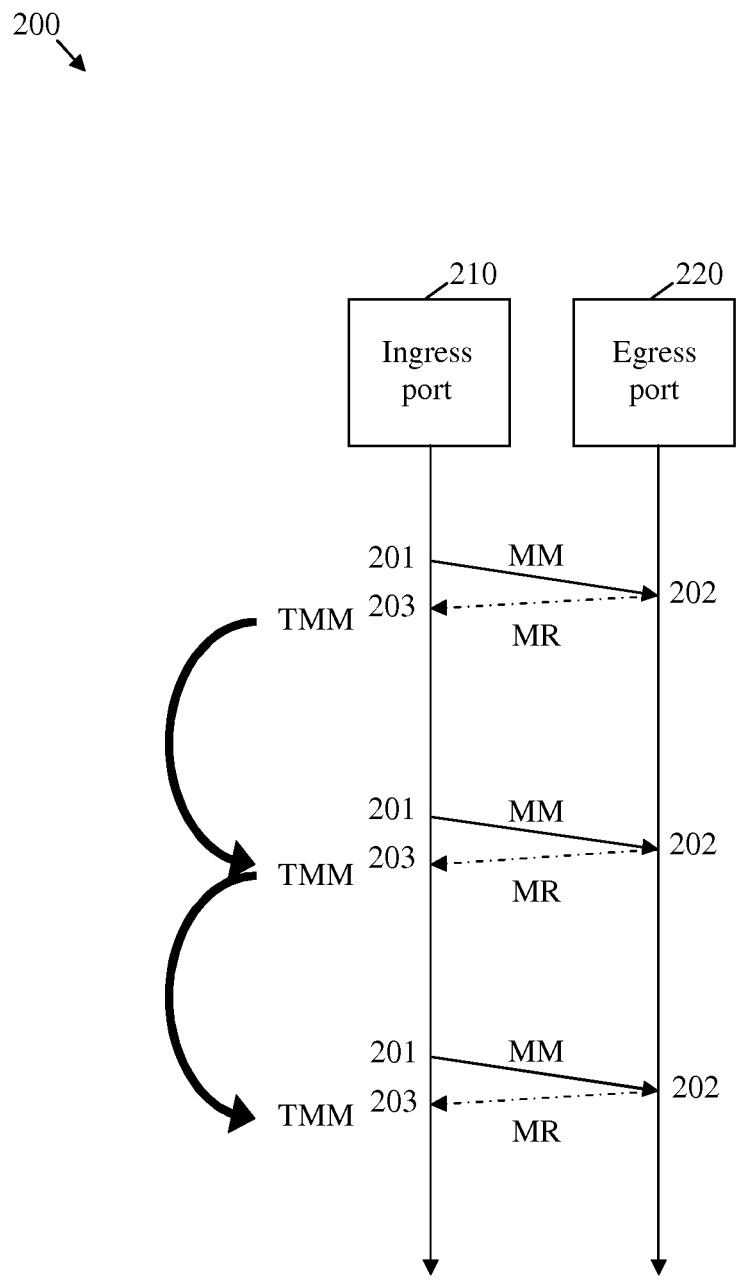
FIG. 2 is a schematic diagram of an embodiment of a throughput measurements method.

FIG. 2 illustrates an embodiment of a throughput measurements method 200 that may be implemented between any two coupled nodes from the core nodes 112 and edge nodes 114. The exchanged throughput measurements data may be associated with a link or connection between the two nodes. The throughput measurements method 200 may be initiated by an ingress or first node 210 at step 201, where the first node 210 may send a MM frame to an egress or second node 220. The MM frame may comprise an octet count in the forward direction (TxOCf) and a first timestamp. The MM frame may be addressed to follow the same path as the packet flow being measured to ensure that the octet count in the MM frame corresponds to the packets being measured. At step 201, the first node 210 may implement the following steps to process the MM frame:

1) generate the MM frame;
2) set a throughput measurement request bit;
3) add a TxOCf count;
4) add a timestamp; and
5) transmit the MM frame.

At step 202, the second node 220 may receive the MM frame, add a received octet count in the forward direction (RxOCf) and a transmitted octet count in the backward direction (TxOCb) to the received values in the MM frame, modify the received frame's header, and return all that information in a MR frame to the first node 210. The second node 220 may also add a second timestamp to the MM frame. Similar to the MM frame, the MR frame may be addressed to follow the same path as the packet flow being measured. At step 202, the second node 220 may implement the following steps to process the MR frame:
1) receive the MM frame and modify the frame to generate the MR frame;
2) read the throughput measurement request bit;
3) add RxOCf and TxOCb counts;
4) optionally add a timestamp for backward transmit; and
5) transmit the MR frame At step 203, the first node 210 may receive the MR frame, add a local received octet count (RxOCl) (or received octet count in the backward direction (RxOCb)) to the counts or values in the MR frame, modify the received frame's header, and forward all that information in a Throughput Measurement Message (TMM) frame to a post-processing entity (not shown). The post-processing entity may be any node, device, or component configured to store and process the counts in the TMM to calculate the throughput of the corresponding packet flow. For instance, the post-processing entity may be a line card processor, node control processor, or management system processor, which may be located in any of the core nodes 112 or the edge nodes 114 or may be coupled to the packet based network 100, e.g., in an external network 140.

At step 203, the first node 210 may implement the following steps to process the MR frame:
1) receive the MR frame;
2) read the throughput measurement bit;
3) add a RxOCb count;
4) optionally, change or add a header to generate the TMM frame; and
5) transmit the TMM frame.

Subsequently, the post-processing entity may implement the following steps to process the received TMM frames:
1) select two TMM messages or frame;
2) check the time interval between the to TMM frames to ensure no counter wrapping; and
3) calculate a throughput for the time interval.

The steps 201, 202, and 203 may be repeated to exchange a plurality of MM and MR frames between the two nodes and forward a plurality of TMM frames to the post-processing entity. As such, multiple sets of octet counts that are associated with the same connection between the two nodes may be sent to and stored at the post-processing entity, e.g., over time. At the start of the throughput measurements method 200, the first node 210 may send a first MM frame at a relatively slow rate to allow the second node 220 to prepare measurement resources, e.g., to start generating the frame counts. The first MM frame may indicate to the second node 220 a query or request to start a throughput measurements process. The rate may be controlled by a network management system (NMS) to ensure that the second node 220 is ready to begin the throughput measurements process when the second node 220 receives the MM frame. Subsequently, when the first node 210 receives from the second node 220 a valid MR frame, e.g., that comprises non-zero value frame counts, the first node 210 may send a second MM frame at a faster rate. After receiving the first MM frame, if the second node 220 does not have enough resources to perform measurements and obtain the frame counts, the second node 220 may ignore the throughput measurements query or request from the first node 210, or return a MR frame that indicates rejecting the request.

The multiple sets of octet and/or frame counts and timestamps generated during the throughput measurements method 200 may be combined and then processed jointly at the post-processing entity to calculate the packet throughput over the same connection. The sets of octet and/or frame counts may be used to calculate an average throughput over the duration of the throughput measurements method 200. The average throughput may be calculated for a measurement interval between any two transmitted MM frames, e.g., between two subsequent message cycles of steps 201, 202, and 203, using n-bit counters, where n is an integer. For example, the LM protocol may support both about 32-bit and/or about 64-bit counters. The two subsequent message cycles may or may not be consecutive, i.e., immediately subsequent to one another.

The first node 210 may add a first timestamp in each transmitted MM frame. As such, the time interval between any subsequent or consecutive MM frames may be equal to the difference between a last timestamp $T_2$ and a previous timestamp $T_1$, where $T_2 > T_1$. Similarly, the second node 220 may also add a second timestamp in each returned MR frame. In the case of using timestamps to determine the time interval, a method may also be needed to determine a change in time base for the timestamps. In this case, the packet throughput calculations may comprise:

Offered Throughput (ingress-egress)=$(TxOCf[T_2]-TxOCf[T_1])/(T_2-T_1)$;
Delivered Throughput (ingress-egress)=$(RxOCf[T_2]-RxOCf[T_1])/(T_2-T_1)$;
Offered Throughput (egress-ingress)=$(TxOCb[T_2]-TxOCb[T_1])/(T_2-T_1)$; and
Delivered Throughput (egress-ingress)=$(RxOCl[T_2]-RxOCl[T_1])/(T_2-T_1)$.

The parameters $T_1$ and $T_2$ correspond to the previous timestamp and the last timestamp, respectively.

In another embodiment, the first of the two subsequent MM frames may comprise a first sequence number $S_1$ and the second of the two LMM frames may comprise a sequence number $S_2$, where $S_1$ and $S_2$ may be integers and $S_1 < S_2$. The two subsequent message cycles may be separated by at least a nominal time interval, $\Delta t$, which may be a constant r fixed interval that separates two consecutive message cycles. The time interval may be short enough to prevent a second set of counts generated in the second cycle from wrapping around, e.g., return to zero, after a first set of non-zero counts generated in the first cycle preceding the second cycle. The packet throughput calculations may comprise the following throughput values:

Offered octet throughput forward=$((TxOCf_2-TxOCf_1)$ modulo $2^n)/((S_2-S_1)\Delta t)$;
Delivered octet throughput forward=$((RxOCf_2-RxOCf_1)$ modulo $2^n)/((S_2-S_1)\Delta t)$;
Offered octet throughput backward=$((TxOCb_2-TxOCb_1)$ modulo $2^n)/((S_2-S_1)\Delta t)$;
Delivered octet throughput backward=$((RxOCb_2-RxOCb_1)$ modulo $2^n)/((S_2-S_1)\Delta t)$.

The subscripts 1 and 2 above correspond to the first set of counts and the second set of counts. However, using timestamps to determine time intervals may be more accurate than using sequence numbers and nominal time intervals, as described above.

The counters used may be unsigned integers and may be large enough so that the counters do not wrap around in less than some multiple of message cycles or time intervals, e.g., more than two message cycles. As such, even if some of the MM and/or MR frames are lost, e.g., during a message cycle, the throughput count for two subsequent message cycles, which may not be consecutive, may be determined with sufficient accuracy. A throughput value may be calculated by calculating the difference between a count in the last message cycle and a corresponding count in a previous message cycle modulo $2^n$, and dividing the difference by the total time interval between the previous and last message cycles, which may not be consecutive cycles. The time interval between two subsequent message cycles may correspond to the difference between the corresponding non-zero sequence numbers (e.g., S1 and S2) of the frames in the two message cycles multiplied by the nominal time interval, $\Delta t$, for two consecutive message cycles. If one or both of the used sequence numbers is equal to about zero of if the last sequence number is less than the previous sequence number, than the throughput value may not be accurately determined, and thus may not be considered.

In an embodiment, the MM frame may be a LMM frame that comprises the frame count TxFCf, the MR frame may be a LMR frame that comprises the frame counts TxFCf, RxFCf, and TxFCb, and the TMM frame may comprise the frame counts TxFCf, RxFCf, TxFCb, and RxFCl (or RxFCb). The LMM frame may comprise the frame counts and a timestamp with or without the octet counts. The frame counts may be used to measure a frame throughput for the packets and packet loss, e.g., based on ITU-T Recommendation Y.1731. For example, using the timestamp method, the frame throughput calculations may comprise the following throughput values:

Offered frame throughput forward=(TxFCf[$T_2$]−TxFCf[$T_1$])/($T_2$−$T_1$);
Delivered frame throughput forward=(RxFCf[$T_2$]−RxFCf[$T_1$])/($T_2$−$T_1$);
Offered frame throughput backward=(TxFCb[$T_2$]−TxFCb[$T_1$])/($T_2$−$T_1$); and
Delivered frame throughput backward=(RxFCb[$T_2$]−RxFCb[$T_1$])/($T_2$−$T_1$).

To enable the coordination between the measurement functions at the first node 210 and the second node 220, additional information may be included in the MM and/or MR frames. For example, the additional information may comprise:

1. A flag that is set to indicate that the second node 220 is willing to perform throughput measurements. When reset, the flag indicates that throughput measurements should stop.
2. A flag that is set to indicate that the MM frame is to request starting measurement. When reset, the flag indicates that a count in the MM is not valid.
3. A flag that that is set to indicate that the second node 220 is actively counting (e.g., using octet and/or frame counts). When reset, the flag indicates that frame and/or octet counting is not active at the second node 220.
4. A minimum nominal measurement frame or time interval that is supported by the second node 220.
5. The nominal time interval used at the first node 210 for sending MM (e.g., $\Delta t$).

In an embodiment, the second node 220 may send a minimum nominal measurement time interval in a first LM frame to the first node 210. The first node 210 may then decide on a nominal time interval to be used and send the nominal time interval in a subsequent MM frame to the second node 220. If the second node 220 does not receive a nominal time interval in the subsequent MM frame, the second node 220 may resend the same or another minimum nominal measurement time interval in one or more subsequent LM frames to the first node 210 until the first node 210 returns a selected nominal time interval to the second node 220. When the second node 220 receives the nominal time interval, the second node 220 may stop sending a minimum nominal measurement time interval in the LM frames.

Additionally, the LM frames may comprise a notification value to indicate that the egress measurement resources (at the second node 220) are preempted or released by an administrator or operator and thus the throughput measurements should end. The LM frames may also comprise an indication that the second node 220 does not support a version of the first node 210, so that the first node 210 may determine whether to provide useful data. If the second node 220 may not support a version of the first node 210, the second node 220 may return some of the information, e.g., in type-length-values (TLVs), received from the first node 210 without processing the information. In this case, the LM frame may comprise an indication that the received TLVs are copied and returned to the first node 210.

Figure 3:
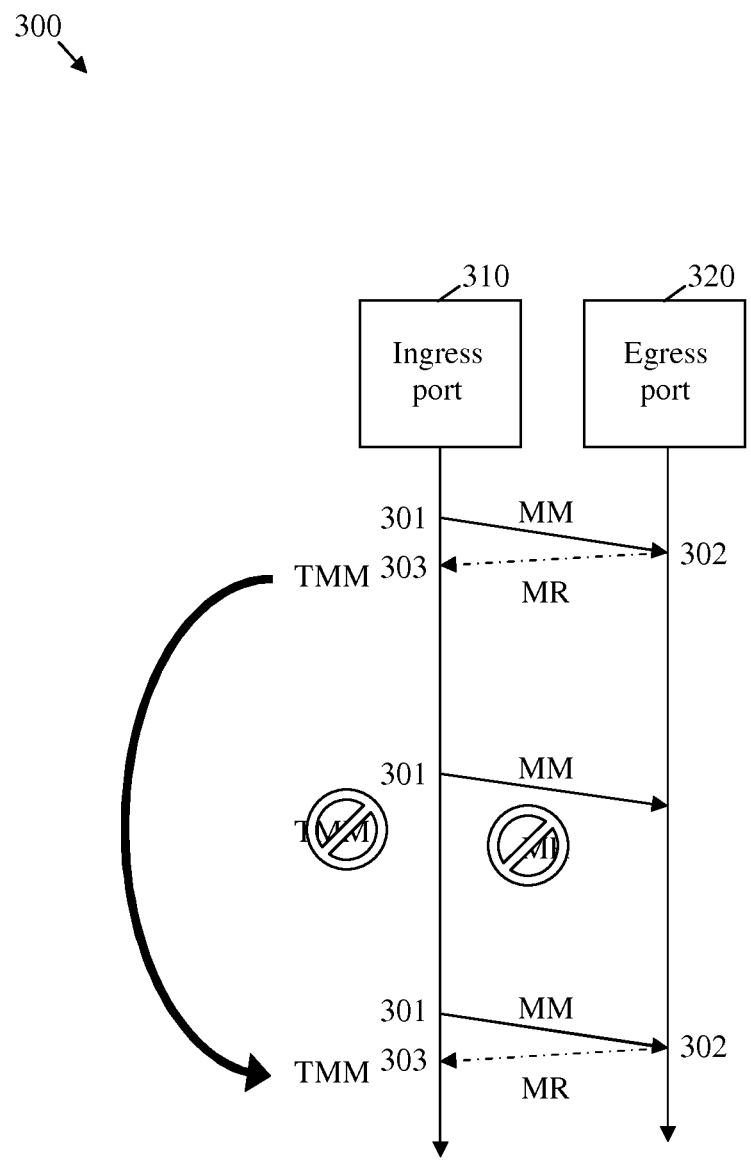
FIG. 3 is a schematic diagram of an embodiment of a throughput measurements method.

FIG. 3 illustrates an embodiment of another throughput measurements method 300 that may be implemented between any two coupled nodes in the packet based network 100, e.g., from the core nodes 112 and edge nodes 114. The exchanged throughput measurements method 300 may be associated with a link or connection between the two nodes. The throughput measurements method 300 may be similar to the throughput measurements method 200 but include the case where some MM and/or MR frames may be lost, e.g., due to traffic congestion, noise, or link/node errors. The throughput measurements method 300 may be initiated by an ingress or first node 310 at step 301, where the first node 310 may send a MM frame to an egress or second node 320. At step 302, the second node 320 may receive the MM frame and return a MR frame to the first node 310. At step 303, the first node 310 may receive the MR frame and forward a TMM frame to a post-processing entity for processing measurements and calculating packet throughput, as described above.

The steps 301, 302, and 303 may be substantially similar to the steps 201, 202, and 203, respectively, and may similarly be repeated to exchange a plurality of MM and MR frames between the two nodes. However, at least one MM, MR, or TMM frame may be lost, and the lost information may not be collected or used by the post-processing entity. For instance, a MR frame may be lost or not received by the first node 310 in response to a transmitted MM frame, e.g., after the initial message cycle. When the first node 310 does not receive the MR frame from the second node 320, the first node 310 may not send a corresponding TMM frame to the post-processing entity in that message cycle. Thus, the post-processing entity may lack at least some of the counts or values needed to compute throughout values for that message cycle, e.g., during the nominal time interval. This may affect the precision of the throughput calculations for that message cycle, but may not substantially affect the calculated average throughput over the total time interval of all the message cycles, e.g., for the entire duration of the throughput measurements method 200.

Specifically, the TMM frames received by the post-processing entity may comprise timestamps or sequence numbers that may allow using the information or counts in any two subsequent TMM frames (of two subsequent message cycles) to calculate packet throughput. As described above, if the sequence numbers are used, then a time interval equal to the product of the nominal time interval and the difference between the two sequence numbers may be used to calculate the throughput values. If the timestamps are used, then a time interval equal to the difference between the two timestamps may be used to calculate the throughput values. For example, the post-processing entity may still use the information (or counts) received in the first message cycle and the information received in the last message to calculate throughput values over the total time interval, which includes the time interval of the message cycle affected by the lost frame. Alternatively, the post-processing entity may use the information received in a message cycle preceding the message cycle affected by the frame loss and the information received in a message cycle subsequent to the message cycle affected by the frame loss to calculate throughput values over a larger time interval that includes the time interval of the message cycle affected by the frame loss.

The MM and MR frames in the throughput measurements methods 200 and 300 may be based on the ITU-T Recommendation Y.1731 and extended to include octet counts and any of the additional information described above. The extensions to the LMM and LMR frames may allow frame and octet throughput measurements using an egress node, such as the second node 220 or 230, that supports the Y.1731 loss measurement method. For instance, the additional information used for throughput measurements may be added in reserved flag fields in the frames or in additional TLVs appended after the frames' current existing count fields. Alternatively, the octet counts may be kept only at the ingress node, such as the first node 210 or 220, and added by the ingress node to the measured frame counts in the LMR frames that are received from the egress node. In this case, throughput measurements may be performed without change to the existing LMM and LMR frame formats.

In an embodiment, it may be assumed that the estimated received octet count at the egress node matches the measured transmitted octet count at the ingress node (e.g., $RxOCf_{estimated}=TxOCf_{measured}$) and the estimated transmitted octet count at the egress node matches the measured received octet count at the ingress node (e.g., $TxOCb_{estimated}=RxOCb_{measured}$) when no frames are lost during a measurement or time interval. Under this assumption, if some frames are lost during a measurement or time interval, then the estimated octet counts for the egress node may be adjusted based on an estimate of the lost octets, e.g., using a nominal average frame size. Alternatively, in the case of lost frames, an error range may be calculated using minimum and maximum frame sizes. This may provide some amount of backward compatibility with existing systems and allow throughput measurements without upgrading some existing equipment.

In an embodiment, the throughput values may be calculated using a plurality of delivered octet counts that are estimated within an error range based on a maximum or minimum packet size, a plurality of delivered frame counts, a plurality of offered frame counts, and a plurality of offered octet counts. Alternatively, the throughput values may be calculated using a plurality of offered octet counts that are estimated within an error range based on a maximum or minimum packet size, a plurality of delivered frame counts, a plurality of offered frame counts, and a plurality of delivered octet counts.

In an embodiment, to simplify octet counting and/or reduce the resources needed for octet counting, only transmitted octets or received octets at both the ingress and egress nodes may be counted but not both transmitted and received octets. It may also be assumed that if no frames are lost then the estimated octet count matches the measured octet count in the transmitted or received direction, as described above. This may reduce the hardware complexity and/or cost compared to the case where both the transmitted and received octets are counted.

Further, a destination address may be provisioned at the ingress node for use with the information in the MR frames received from the egress node. This address may be used in the TMM frames to transmit the TMM frames from the ingress node to the post-processing entity. A source address may also be provisioned at the ingress node for use with TMM frames when sending the throughput measurements information to the post-processing entity. Since there may be no need to send messages or frames back from the post-processing entity to the ingress node, the source address may be assigned by a MNS to uniquely identify the corresponding throughput measurements information. The source address may be used by the post-processing entity to distinguish the received measurements information in a received TMM frame from different measurements information in other received TMM frames. Such source addresses in the TMM frames may be reused at different times and may not be associated with or indicate a particular node or interface in the network.

Figure 4:
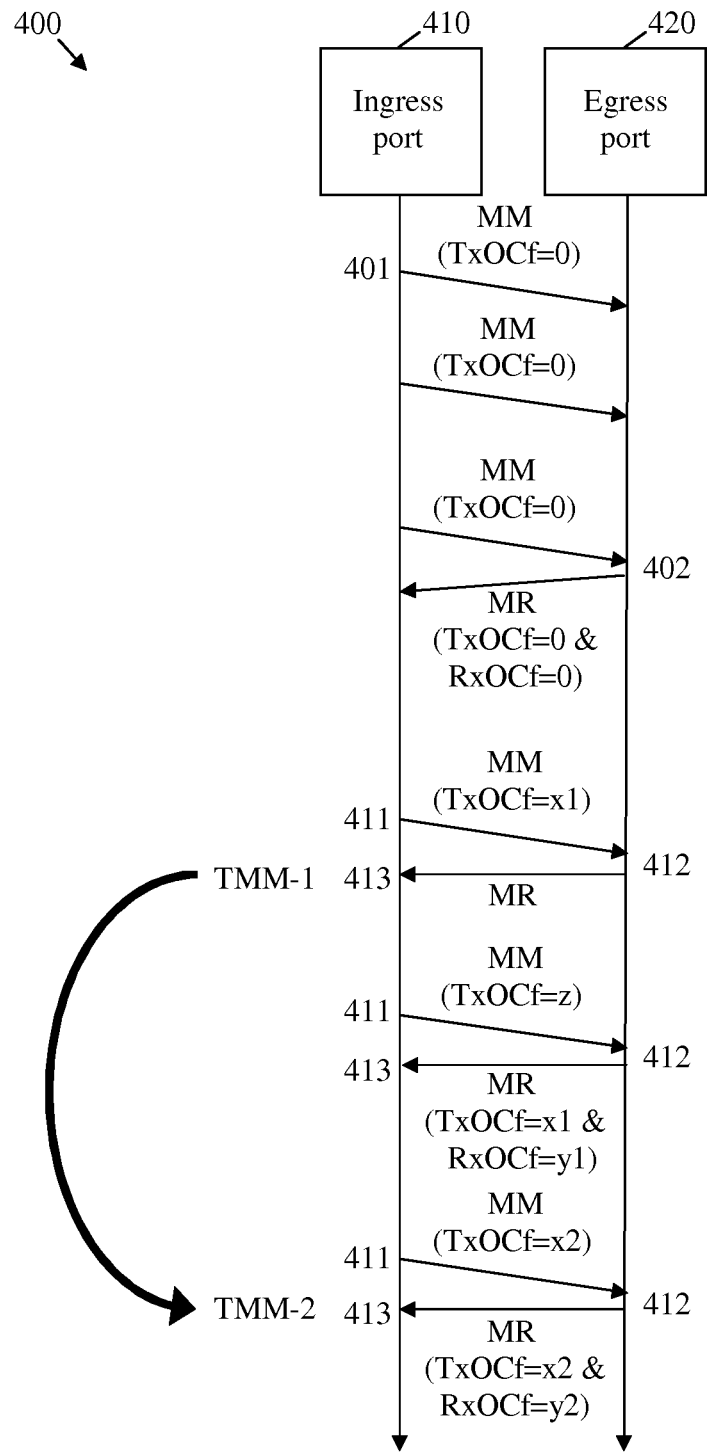
FIG. 4 is a schematic diagram of an embodiment of a throughput measurements starting method.

FIG. 4 illustrates an embodiment of a throughput measurements starting method 400 that may be implemented between any two coupled nodes in the packet based network 100, e.g., to start the throughput measurements starting method 200. The throughput measurements starting method 400 may begin at step 401, where an ingress or first node 410 may send a first MM frame to an egress or second node 420. The first node 410 may set a flag in the MM frame to request starting a throughput measurements process. If the second node 420 can't or is not willing to start the throughput measurements process, e.g., due to limited resources, the second node 420 may ignore the received MM and may or may not send back a MR frame to deny the requested measurements. The rate or frequency of the first MM frame for requesting starting the measurements may be relatively slow to allow enough time for the second node 420 to check if the requested measurements may be generated.

The first node 410 may time out the measurements request after not receiving a MR frame from the second node 420 after a determined number of consecutively transmitted first MM frames. For example, the first node 410 may send the first MM frame up to about three times before timing out the measurements request if the second node 420 does not return back a MR frame. In this case, the first frame may restart the throughput measurements starting method 400 subsequently at another time. In an embodiment, the second node 420 may send one or more MR frames in a rate-limited manner to allow configuring resources to start throughput measurements. During an initialization time to start the throughput measurements, the first node 410 may receive and discard the measurement replies. The initialization time may correspond to a time period that may be determined by setting a timer (at the first node 410), e.g., to differentiate between an acceptable initialization delay and a permanent unavailability condition.

Since measuring transmitted frames requires processing time, the first node 410 may not begin measuring the transmitted frame count until receiving a MR frame that confirms that the second node 420 is ready or willing to begin measurements, e.g., to save processing time and resources at the first node 410. A flag in the first MM frame may be set to indicate that the counts in the first MM frame are not valid. Additionally, the first node 410 may not allocate the resources needed for measurements and may not change the data path for the flow whose throughput is to be measured until receiving the MR frame from the second node 420.

The first node 410 may send the first MM frames to the second node 420 at a relatively low nominal rate to initiate the throughput measurements. If the second node 420 accepts to perform the throughput measurements, then the nominal interval that corresponds to the nominal rate may be adjusted to a value that is greater than or equal to the minimum nominal interval supported and indicated by the second node 420. If the first node 410 does not receive a MR frame after about a multiple of nominal intervals, e.g., after about three nominal intervals, then the first node 410 may abort the measurements process and release any resources allocated to the measurements process.

At step 402, the second node 420 may receive the first MM frame and return a MR frame to the first node 410. Upon receiving the first MM frame, the second node 420 may check its capability to generate the requested measurements. If the second node 420 is capable of starting the measurements, then the second node 420 may start allocating the resource needed and change the data flow path according to the flow to be measured. After completing resource allocation and flow path update, the second node 420 may return a MR frame to the first node 410 upon receiving a next MM frame from the first node 410, which may be a retransmitted first MM frame. During this measurement initiation process at the second node 420, the second node 420 may receive multiple transmitted first MM frames, e.g., up to about three transmitted first MM frames. The transmitted or retransmitted first MM frames may comprise a sequence equal to about zero. The first node 410 may then increment the sequence number, e.g., to about one, after receiving the MR frame from the second node 420 that indicates the start of the measurements process.

The subsequent steps 411, 412, and 413 may be implemented during the measurements process and may be substantially similar to the steps 201, 202, and 203, respectively, of the throughput measurements method 200. The steps 411, 412, and 413 may also be similarly repeated to exchange a plurality of MM and MR frames between the two nodes and a plurality of TMM frames (e.g., from TMM-1 to TMM-2) with a post-processing entity (not shown). The measurements process may also be stopped by any of different methods or schemes. The measurements process may be stopped if at any time, the second node 420 responds to the first node 410 with a MR frame that indicates that the measurements should stop. Thus, the first node 410 may stop sending MM frames. Alternatively, the first node 410 may stop the measurements process if the first node 410 does not receive a MR frame over a determined number of nominal time intervals or after receiving a MR frame that comprises a flag set to indicate that the requested measurements cannot be performed. The second node 420 may also stop the measurements process if the second node 420 does not receive any MM frames over a determined number of nominal time intervals.

In some embodiments, final loss, throughput, and/or delay calculations may be performed at the post-processing entity or system, such as a network management server, or the ingress node, e.g., the first ingress node 210. The querier (e.g., the first node 210) may forward a final MM using an out-of-band mechanism to the desired post-processing system. Some port-processing systems may have the ability to store measurement data for a relatively extended measurement period and produce a variety of useful statistics from the measurement data. Such use of an off-line post-processing system may also allow the measurement function at the querier to be substantially stateless.

Figure 5:
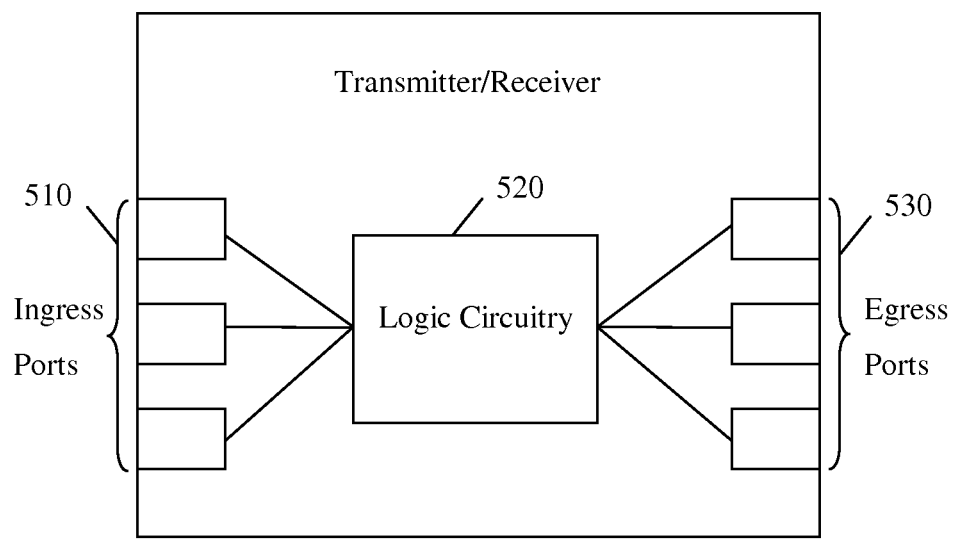
FIG. 5 is a schematic diagram of an embodiment of a transmitter/receiver unit.

FIG. 5 illustrates an embodiment of a transmitter/receiver unit 500, which may be any device that transports packets through a network. For instance, the transmitter/receiver unit 500 may be located in the core nodes 112, the edge nodes 114, and/or or any node in the packet based network 100. The transmitted/receiver unit 500 may comprise one or more ingress ports or units 510 for receiving packets, objects, or TLVs from other network components, logic circuitry 520 to determine which network components to send the packets to, and one or more egress ports or units 530 for transmitting frames to the other network components.

Figure 6:
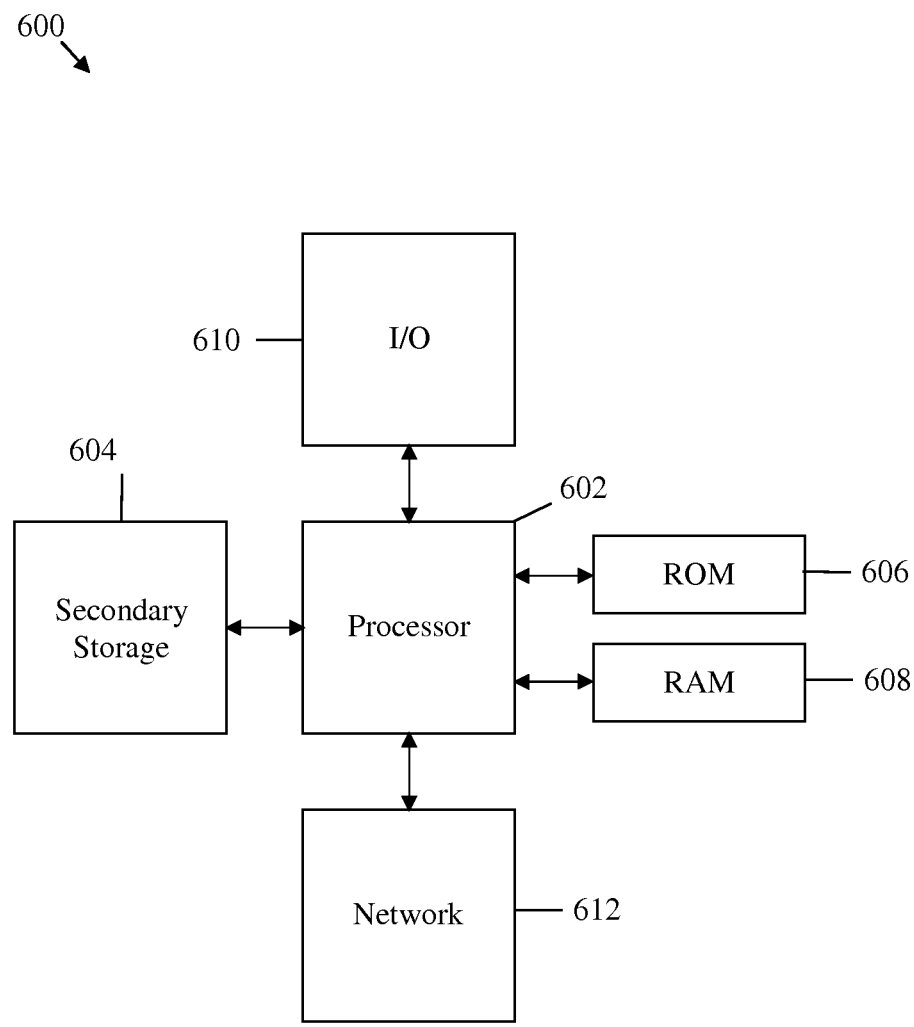
FIG. 6 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 6 illustrates a typical, general-purpose network component 600 suitable for implementing one or more embodiments of the components disclosed herein. The network component 600 includes a processor 602 (which may be referred to as a central processor unit or CPU) that is in communication with memory devices including second storage 604, read only memory (ROM) 606, random access memory (RAM) 608, input/output (I/O) devices 610, and network connectivity devices 612. The processor 602 may be implemented as one or more CPU chips, or may be part of one or more application specific integrated circuits (ASICs).

The second storage 604 is typically comprised of one or more disk drives or tape drives and is used for non-volatile storage of data and as an over-flow data storage device if RAM 608 is not large enough to hold all working data. Second storage 604 may be used to store programs that are loaded into RAM 608 when such programs are selected for execution. The ROM 606 is used to store instructions and perhaps data that are read during program execution. ROM 606 is a non-volatile memory device that typically has a small memory capacity relative to the larger memory capacity of second storage 604. The RAM 608 is used to store volatile data and perhaps to store instructions. Access to both ROM 606 and RAM 608 is typically faster than to second storage 604.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
   a first node configured to couple to a second node,
   wherein the first node is further configured to exchange a plurality of timestamps recording transmission times and at least one of a plurality of octet counts and a plurality of frame counts with the second node to perform throughput measurements, and
   wherein the at least one of the plurality of octet counts and the plurality of frame counts correspond to a packet flow between the first node and the second node and are used to calculate throughput for the packet flow based on a time interval of the exchanged at least one of the plurality of octet counts and the plurality of frame counts that is determined using the time stamps.

2. The apparatus of claim 1, wherein the at least one of the plurality of octet counts and the plurality of frame counts are exchanged in a plurality of message cycles between the first node and the second node, and wherein each message cycle comprises a measurement message (MM) frame sent from the first node to the second node and a measurement reply (MR) frame returned from the second node to the first node.

3. The apparatus of claim 1, wherein the first node is further configured to couple to a post-processing entity and exchange a throughput measurement message (TMM) that comprises a timestamp and at least one of the octet counts and the frame counts with the post-processing entity.

4. The apparatus of claim 3, wherein the TMM frame comprises a destination address associated with the post-processing entity, a source address that uniquely identifies the throughput measurements for the packet flow, or both, and wherein the post-processing entity is located at a separate location from the first node.

5. The apparatus of claim 1, wherein the frame counts are used for calculating packet loss based on the Telecommunication Standardization Sector (ITU-T) Recommendation Y.1731, wherein the frame counts are inserted in a loss measurement message (LMM) sent from the first node to the second node and/or a loss measurement reply (LMR) sent from the second node to the first node, and wherein the octet counts are kept locally at the first node or are added in a type-length-value (TLV) in the LMM and/or the LMR.

6. The apparatus of claim 1, wherein the first node is further configured to set the timestamps and the octet counts and/or the frame counts to about zero to indicate that the throughput measurements have not started and that the octet counts and/or the frame counts are not valid.

7. The apparatus of claim 1, wherein the throughput measurements are not started if a measurement reply is not received from the second node after transmitting a maximum number of measurement messages from the first node or if a measurement reply is received indicating the second node rejects starting throughput measurements.

8. The apparatus of claim 1, wherein the first node is further configured to transmit a plurality of measurement messages to the second node at a slower rate than a plurality of subsequently transmitted measurement messages to the second node to allow the second node to configure measurement resources and indicate a minimum query interval.

9. The apparatus of claim 1, wherein the first node is further configured to send an indication to the second node to stop the throughput measurements after the throughput measurements have started.

10. A network component comprising:
    a receiver configured to receive a measurement message that comprises a time interval counter, a first octet count, and an indication of a query for throughput measurements;
    a logic circuit configured to generate a second octet count if the query is accepted; and
    a transmitter configured to send in a measurement reply, the time interval counter, the first octet count, the second octet count, and an indication that the query is accepted or rejected.

11. The network component of claim 10, wherein the query is rejected if a measurement reply is not sent after a determined time period or if a message is sent that indicates rejecting the query.

12. The network component of claim 10, wherein the time interval counter is a sequence number, wherein a plurality of subsequently received measurement messages are separated by about the same nominal time interval and comprise a plurality of subsequent increments of non-zero sequence numbers.

13. The network component of claim 10, wherein the measurement reply comprises a notification code of initialization in progress that indicates that the query for throughput measurements was processed but does not comprise valid measurement data because an initialization process is not completed.

14. The network component of claim 13, wherein a second measurement reply is transmitted after the measurement reply and comprises an indication that the throughput measurements have started.

15. The network component of claim 10, wherein the measurement reply comprises an indication for preparing to count packets if the query is accepted, a minimum query interval supported for throughput measurements, an indication of starting the throughput measurements, or combinations thereof.

16. The network component of claim 10, wherein the throughput measurements are stopped if the measurement reply indicates that the throughput measurements should stop or the measurement reply is not sent over a determined time interval.

17. A method comprising:
  receiving at least one of a plurality of frame counts and a plurality of octet counts that correspond to a first throughput measurement exchange and a subsequent second throughput measurement exchange;
  determining a time interval between the first throughput measurement exchange and the second throughput measurement exchange based on a first timestamp for the first throughput measurement exchange and a second timestamp for the second throughput measurement exchange; and
  calculating a plurality of throughput values based on at least one of the frame counts and the octet counts and based on the time interval.

18. The method of claim 17, wherein the throughput values are calculated using a plurality of delivered octet counts that are estimated within an error range based on a maximum or minimum packet size, a plurality of delivered frame counts, a plurality of offered frame counts, and a plurality of offered octet counts or using a plurality of offered octet counts that are estimated within an error range based on a maximum or minimum packet size, a plurality of delivered frame counts, a plurality of offered frame counts, and a plurality of delivered octet counts.

19. The method of claim 17, wherein time interval is equal to a product of a nominal time interval and a difference between a second sequence number for the second throughput measurement exchange and a first sequence number for the first throughput measurement exchange.

20. The method of claim 17, wherein time interval is equal to a difference between a second timestamp for the second throughput measurement exchange and a first timestamp for the first throughput measurement exchange.

21. A method for obtaining a throughput measurement within a measurement session, comprising:
  transmitting one or more query messages;
  initializing a timer that indicates how long to wait for a response before abandoning the measurement session;
  receiving one or more responses to one or more query messages, wherein at least one of the responses comprises:
    a notification that indicates whether an exception condition prevents generating a a response that contains valid measurement data; and
    a session query interval (SQI) with a value that is set to a minimum query interval supported for the measurement session; and
  terminating the measurement session when at least one of the following occurs: the timer has timed out and the notification indicates the exception condition prevents the response that contains valid measurement data.

22. The method of claim 21, further comprising selecting a query interval for the measurement session that is greater than or equal to the value specified in the SQI, wherein at least some of the query messages are transmitted at the query interval, and wherein the notification indicates the at least one of the responses do not contain valid measurement data because a responder's initialization process has not completed.

23. The method of claim 21, wherein at least one of the query messages comprise a timestamp recording of a time transmission for the measurement query message and a counter 1 field that indicates the total count of units transmitted prior to transmission of the at least one of the query messages, and wherein the at least one of the responses further comprises a second timestamp recording of a time of transmission for the at least one of the responses and a counter 2 field that indicates a total count of units received prior to the at least one of the responses.

24. The method of claim 23, forwarding the at least one of the responses to an external post-processing device dedicated to a throughput measurement computation, wherein a first query measurement message is used to initiate the measurement session, and wherein the counter 1 field and the counter 2 field are used in the throughput measurement computation.

25. The method of claim 24, wherein the total count of units for the counter 1 field are in octets, and wherein the total count of units for the counter 2 field are in octets, and wherein the timer resets each time after a response is received.

* * * * *

UNITED STATES PATENT AND TRADEMARK OFFICE
CERTIFICATE OF CORRECTION

PATENT NO. : 8,665,746 B2  
APPLICATION NO. : 13/074102  
DATED : March 4, 2014  
INVENTOR(S) : T. Benjamin Mack-Crane and Linda Dunbar Page 1 of 1

It is certified that error appears in the above-identified patent and that said Letters Patent is hereby corrected as shown below:

Title Page:

Column 1
Page 2, Item (56) References Cited, under Other Publications, the following references should read:

"FROST, D., Ed., et al., "A Packet Loss and Delay Measurement Profile for MPLS-based Transport Networks," draft-ietf-mpls-tp-loss-delay-profile-00, December 23, 2010, 6 pages.

FROST, D., Ed., et al., "A Packet Loss and Delay Measurement Profile for MPLS-based Transport Networks," draft-ietf-mpls-tp-loss-delay-profile-01, December 24, 2010, 6 pages.

FROST, D., Ed., et al., "A Packet Loss and Delay Measurement Profile for MPLS-based Transport Networks," draft-ietf-mpls-tp-loss-delay-profile-02, February 4, 2011, 6 pages.

ANDERSSON, L., et al., "Multiprotocol Label Switching (MPLS) Label Stack Entry: "EXP" Field Renamed to "Traffic Class" Field," RFC 5462, February 2009, 10 pages."

Column 2
"HEDAYAT, K., et al., "A Two-Way Active Measurement Protocol (TWAMP)," RFC 5357, October 2008, 27 pages."

In the Claims:

Column 16/Line 27 should read: "2 field that indicates a total count of units received prior to the"

Signed and Sealed this
Twenty-seventh Day of May, 2014

Michelle K. Lee
*Deputy Director of the United States Patent and Trademark Office*